United States Patent [19]

Hungerford

[11] 4,391,939
[45] Jul. 5, 1983

[54] POLYMER FILM TREATMENT WITH ORGANIC IMPREGNANT

[75] Inventor: Gordon P. Hungerford, Palmyra, N.Y.

[73] Assignee: Mobil Oil Corporation, New York, N.Y.

[21] Appl. No.: 255,029

[22] Filed: Apr. 17, 1981

[51] Int. Cl.³ .............................................. B29C 25/00
[52] U.S. Cl. .................................... 524/377; 264/343; 524/565
[58] Field of Search ............... 524/377, 565; 427/384; 264/343

[56] References Cited

U.S. PATENT DOCUMENTS

| | | | |
|---|---|---|---|
| 2,715,112 | 8/1955 | Stanton | 260/45.7 |
| 3,015,570 | 1/1962 | Bowman | 106/181 |
| 3,400,187 | 9/1968 | Farrow | 427/384 X |

Primary Examiner—Michael R. Lusignan
Attorney, Agent, or Firm—Charles A. Huggett; James F. Powers, Jr.; James P. O'Sullivan, Sr.

[57] ABSTRACT

Acrylonitrile polymer film is treated with non-volatile water-miscible glycol plasticizer to improve toughness and other film properties. In a unique, continuous, steady state process polyacrylonitrile aquagel strip is treated with plasticizer additive in concentrated aqueous solution. Aquagel strip is passed at substantially constant rate through a solution treatment bath. The aquagel strip, which may contain at least about 40 weight % water uniformly dispersed in the polyacrylonitrile, is contacted with the aqueous solution during a predetermined residence time in the bath. After passing the treated aquagel strip from the bath, excess aqueous additive solution is removed. The plasticizer additive can be metered to the aqueous solution at concentration greater than the aqueous additive solution of the bath at a rate substantially proportionate to desired steady state uptake of additive for the aquagel strip. By impregnating the film with a low molecular weight glycol, such as triethylene glycol, in-line plasticizer addition is achieved. Novel glycol-plasticized acrylonitrile polymers and packaging films are made.

9 Claims, 2 Drawing Figures

POLYMER FILM TREATMENT WITH ORGANIC IMPREGNANT

BACKGROUND OF THE INVENTION

This invention relates to treatment of water-containing plastic and production of oriented polymer film therefrom. In particular, it relates to polyacrylonitrile (PAN) compositions and methods for applying a glycol plasticizer to water-containing substrates during film manufacture.

High nitrile polymers are employed in making packaging films, foils and sheets having good resistance to passage of oxygen and water vapor. PAN homopolymer film is an excellent gas barrier material; however, it lacks adequate flex-crack resistance in unmodified form, even after molecular orientation. Addition of an inert or non-hazardous plasticizer to improve flex performance, stress-stain properties, impact strength, etc. is desirable for food packaging or wrap film.

Prior art film manufacturing techniques may incorporate plasticizers or other compatible impregnants prior to the formation and orientation of films. It is an object of the invention to provide a simplified system for treating water-containing sheets with organic impregnants, such as glycol plasticizers.

SUMMARY OF THE INVENTION

Novel glycol-plasticized polyacrylonitrile materials are produced by an improved manufacturing process wherein a polymeric aquagel is contacted with a hydrophilic plasticizing impregnant which diffuses into the polymer in controlled amount.

A continuous procession technique has been found for impregnating a polymeric aquagel by contacting the polymer with an aqueous bath of hydrophilic organic impregnant. The process is particularly adaptable for plasticizing PAN with water-miscible glycols by maintaining a predetermined concentration of organic impregnant in the aqueous bath under steady state process conditions. While passing the continuous polymeric aquagel film through the bath at substantially constant water content, the impregnant is absorbed into the aquagel at predetermined concentration. Impregnant may be added to the aqueous bath in a steady stream consisting essentially of organic impregnant. For instance, the glycol additive can be metered to the bath as substantially undiluted liquid and no additional water is input to the process. The concentration of water components in the aquagel and bath attain equilibrium conditions during continuous processing.

The technique is advantageous in producing polyacrylonitrile containing a plasticizing amount of triethylene glycol, or other non-volatile, low molecular weight polyalkylene glycol to provide increased film toughness. It is an object of this invention to provide self-supporting uniform films consisting essentially of biaxially-oriented high nitrile addition polymer containing at least 80% acrylonitrile repeating units; and dispersed in the polymer a low molecular weight non-volatile polyalkylene glycol in sufficient amount to plasticize the polymer and substantially increase film toughness.

THE DRAWINGS

FIG. 1 is a schematic representation in sideview of a system for producing aquagel film; and FIG. 2 is a schematic sideview of a system for coating, orienting and drying film according to the present invention.

DESCRIPTION OF PREFERRED EMBODIMENTS

Film feedstock to be fed to the orientation-coating system can be derived from continuous film casting or extruding equipment. Flat film may be solvent cast according to the process of U.S. Pat. No. 4,066,731, wherein acrylonitrile homopolymer or interpolymer is cast onto a rotating drum from a sheeting die and coagulated as a self-supporting film. Organic solvent, such as dimethyl sulfoxide, can be washed with water bath to obtain an aquagel film typically containing 40 to 60% water, integrally bound in the molecular interstices or dispersed in the orientable polymer matrix. A tubular PAN film can be extruded and water-coagulated if desired, according to the teachings of U.S. Pat. No. 4,144,299 and the unoriented film can be slit and fed to the treatment and orientation units as a flat strip. Aqueous PAN film can also be made by melt-extrusion of a high temperature polymer hydrate in a known manner.

The preferred film feedstock is an addition polymer material containing sufficient water to be stretched at low temperatures. Acrylonitrile polymers containing at least 5% $H_2O$, preferably aquagels containing about 40 to 60% $H_2O$, are excellent film substrates for use herein. The present system is especially valuable for treating PAN homopolymer, such as duPont Type A resin. Polymers that are particularly useful for treatment with organic impregnants are high-nitrile materials, preferably containing at least 80% acrylonitrile repeating units. Homopolymer PAN, copolymers and interpolymers with hydrophilic ethylenically-unsaturated monomers, such as acrylic acids and esters, etc., may be adapted to the novel process. Typical high-nitrile polymers are disclosed in U.S. Pat. Nos. 2,585,444, 3,873,508, 3,896,204, 3,984,601 and 4,053,442, incorporated herein by reference. While emphasis is placed on those polyacrylonitrile materials which are comprised of very high nitrile content due to the presence of acrylonitrile repeating units in the polymeric chain, it is understood that the inventive concept can be employed with other polymeric aquagels.

Figure 1:
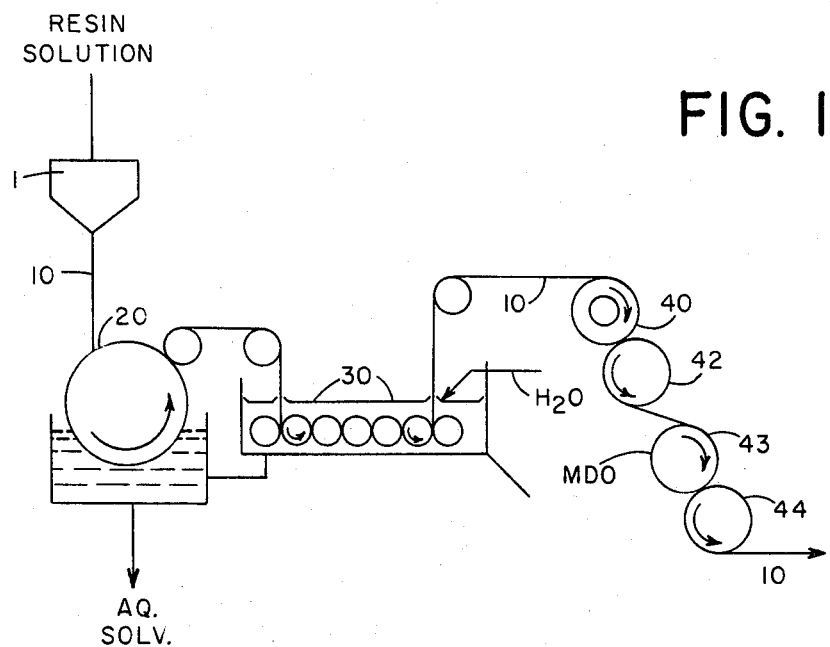

Referring to FIG. 1, a continuous flow system for manufacturing aquagel film is shown. For instance, hot polyacrylonitrile-dimethylsulfoxide solution is fed under pressure to sheeting die 1, which extrudes a thin film of polymer solution onto cold drum surface 20. After contacting an aqueous medium, the self-supporting aquagel film is stripped from drum 20 and traverses a countercurrent aqueous bath 30, wherein the organic solvent is removed and replaced by water, thereby forming the aquagel. The film 10 passes through the machine direction orientor (MDO) 40 comprising a first heated roll maintained at about 75° C. and thereafter a series of orienting rolls 42, 43, 44. These rolls are maintained at a sufficient differential speed to longitudinally stretch the film at a ratio of about 2:1 to 3:1 thereby providing a uniaxially oriented aquagel film. The faster rolls are kept at about 50° C. Thereafter the film is transferred to plasticizer treatment and TDO sections shown in FIG. 2.

Figure 2:
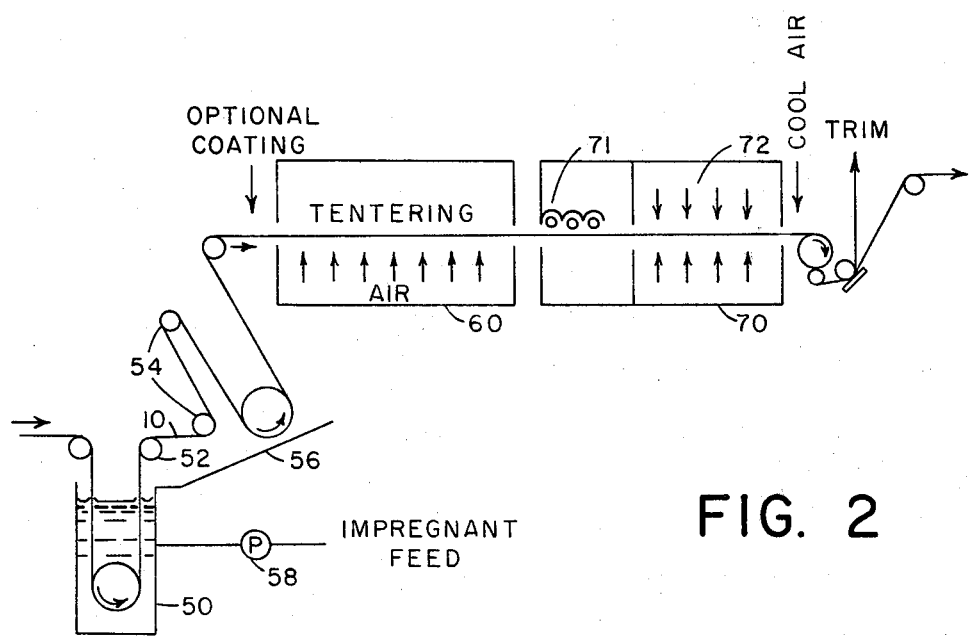

Referring to FIG. 2, the uniaxially oriented aquagel film 10 is passed at constant linear rate (e.g., about 15 cm/sec.) through impregnating treatment tank 50 containing an aqueous bath of organic impregnant, such as triethylene glycol (TEG). There it is maintained in contact with the impregnant solution for adequate residence time. Excess solution may be wiped from the film immediately if sufficient tank residence permits substantial equilibrium. Additional contact time can be obtained by permitting dragout of the treating solution, with downstream rolls 52, 54 removing excess solution and returning it to tank 50 via gravity drip trough 56. This equipment arrangement minimizes tank size. Advantageously, undiluted TEG impregnant is metered at constant rate to tank 50 by metering pump 58. Concentration of impregnant in tank 50 can be self-controlling. For instance, if an aquagel film containing 45 weight percent water is fed at continuous rate and 8-12 parts of TEG per 100 parts of dry polymer is metered to the tank, water migration through the film can maintain a steady state concentration of about 15-30 weight percent TEG in the tank for a 2 second residence time. Accordingly, by addition of pure liquid TEG at the desired rate, uptake of plasticizer by the film and water migration will inherently stabilize at the equilibrium concentration without addition of water to the tank.

While the dip tank application is a preferred expedient in the process, it is understood that hygroscopic plasticizer may be added by other techniques, such as uniformly coating the wet aquagel with pure or diluted TEG by spraying, roll coating, meniscus coating, etc. Other compatible additives, such as dyes, stabilizers, etc. may be incorporated into the PAN product simultaneously with the plasticizers, if desired, or a separate series of steps can treat the aquagel with other materials. For instance, it is often desirable to provide a heat seal or barrier coating on PAN substrate, optionally.

The preferred impregnant comprises at least one plasticizing compound having the formula:

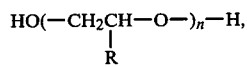

where R is H or CH$_3$, and n is an integer from 2 to 4. These are low molecular weight glycol compounds that can migrate in the polymeric matrix and have a molecular weight range from about 106 to 250. Preferred impregnants are non-volatile, having a normal boiling point of at least 150° C., preferably about 245 to 300° C. Di-, tri- and tetra-ethylene glycol, dipropylene glycol, etc. may be employed alone or in mixture with one another or with other impregnants.

As the film progresses from the optional coating section, as shown in FIG. 2, it passes through a transverse direction orientation (TDO) unit 60. The transverse direction orientation (TDO) step is usually effected by attaching edge clips to the film progressively and stretching the film perpendicular to its machine direction travel. The edge portion are much thicker than the main body of the film and are ordinarily trimmed from the finished product. In the TDO unit the film may be contacted with moist hot gas to prevent excessive water loss. Means for impinging hot watersaturated air or the like at high velocity can be provided in a standard tentering apparatus. TD stretch ratios of 2:1 to 4:1 or higher may be employed, with 3:1 being employed for typical PAN aquagel film.

The biaxially-oriented film is dried under constraint to remove water and other volatile materials which may be present in the film, either residual organic solvent or monomer from the film casting operation or volatile components of secondary organic treating compositions. As the film passes through the drier unit 70, it receives energy from a bank of radiant heaters 71 and thereafter is completely dried in over section 72, where hot air at about 200° C. is directed toward the film at high velocity. Thereafter the film is reduced to handling temperature by a stream of cool air at the exit end of drier 70 and trimmed by slitting blades to remove the edge portions. The biaxially-oriented film may then be wound onto a spool for storage or further processed by addition steps or taken directly to a fabrication line.

In the following description and examples, metric units and parts by weight are employed unless otherwise stated.

EXAMPLES 1 TO 5

Polyacrylonitrile homopolymer aquagel film is made according to U.S. Pat. No. 4,066,731. The sheet weighs about 140 mg/in$^2$ to 250 mg/in$^2$ (38 mg/cm$^2$) and contains about 45-50% water. It is longitudinally stretched 2X on a machine direction orienter with a first heated roll (75° C.) and cooler speed differential rolls (50° C.). The uniaxially oriented wet film enters the treatment apparatus at a linear speed of about 9 meters/minute.

The plasticizing agent is diffused into the aquagel film by passing the film through a dip tank containing about 5 to 30 weight % triethylene glycol at ambient temperature (20°-25° C.). After TD stretch orientation (3X) and drying, the TEG-treated films were compared with untreated pure PAN film for optical, physical and gas barrier properties. Properties are shown in Table I for a variety of standard tests.

TABLE I

| PROPERTY | PROPERTIES OF PAN FILM CONTAINING TRIETHYLENE GLYCOL | | | | |
|---|---|---|---|---|---|
| | RUN #1 CONTROL | RUN #2 | RUN #3 | RUN #4 | RUN #5 |
| Nominal Dip Bath conc. (wt. % TEG) | 0 | 5 | 8 | 15 | 28 |
| Wt % TEG measured in film (dry basis) | 0 | 4.1 | 5.0 | 8.1 | 11.8 |
| Oxygen transmission (TO$_2$) as made (cc/day, 100 in$^2$, atm) | 0.01 | 0.023 | 0.034 | 0.045 | 0.116 |
| TO$_2$ after 10 Gelbo cycles | — | — | — | 0.19 | 0.19 |
| Water vapor transmission (WVTR) as mad (g/day 100 in$^2$) | — | 1.6 | 2.0 | 3.3 | 9.9 |
| Flex-crack test (No. Pinholes after 10 Gelbo cycles) | 5* | 4.5* | 2* | 2 | 0 |
| Extreme flex-crack (No. Pinholes after 100 Gelbo cycles) | — | — | — | 8.5 | 3 |
| Modulus of elasticity Kpsi MD/TD | 751/779 | 655/705 | 638/715 | 575/632 | 524/576 |
| Yield Stress Kpsi MD/TD | 20.1/20.6 | 17.4/17.9 | 17.0/18.0 | 15.5/15.2 | 13.9/13.2 |
| Elongation at break | | | | | |

TABLE I-continued
PROPERTIES OF PAN FILM CONTAINING TRIETHYLENE GLYCOL

| PROPERTY | RUN #1 CONTROL | RUN #2 | RUN #3 | RUN #4 | RUN #5 |
| --- | --- | --- | --- | --- | --- |
| % MD/TD | 48/34 | 61/41 | 69/41 | 77/47 | 72/46 |
| Ultimate tensile stress Kpsi MD/TD | 22.8/28.7 | 22.5/28.8 | 23.5/27.6 | 20.3/24.7 | 18.2/23.0 |
| Impact Strength at 72° F. | 2.4 | 3.8 | 6.1 | 8.6 | 9.1 |
| at 0° F. | 1.6 | 2.3 | 4.9 | 4.1 | 8.8 |
| % Haze after 12 Tabor cycles | 5.7 | — | 5.0 | 4.5 | 5.6 |
| % Shrinkage at 225° F. MD/TD | 0.7/0.2 | 0.8/0.2 | 0.8/0.2 | 0.9/0.3 | 0.9/0.6 |
| % Shrinkage at 400° F. MD/TD | 4.0/1.5 | 4.3/2.6 | 4.8/3.2 | 6.6/6.2 | 8.0/8.5 |

*Large, torn holes

Flex-crack resistance is increased markedly by incorporating at least 5% TEG in the PAN homopolymer film, while gas transmission ($O_2$ and water vapor) does not become excessive with 8 to 12% TEG. Optical clarity remains excellent for the treated film, an important property for food packaging applications. The treated films are less stiff, having higher impact strength and greater elongation at break than untreated PAN. Resistance to damage by handling and abrassion is outstanding. Thermal stability of the film is assured by drying the product at about 200° to 250° C., well below the boiling point of TEG (about 290° C.). Under normal manufacturing and use conditions the preferred glycol plasticizers are non-fugitive, which tends to prolong plasticizing during storage.

EXAMPLE 6

A uniform TEG-impregnated film is made according to Examples 1 to 5 except that an aqueous coating of saran-type polymer is applied immediately prior to TD orientation. The film is coated uniformly on its topside with a vinylidene chloride-vinyl acetate copolymer (Dow saran latex SL-112 containing about 55% solids), sufficient to yield a final dry coating thickness of 40-50 microns. The film then enters the TDO tentering apparatus for lateral stretching (3X). The tentering atmosphere is maintained at about 75° C. and high moisture content (90-100% RH) by steam injection. A radiant heater bank followed by convection oven at 205° C. dries the coating and film substrate simultaneously during a 12 second oven residence time. The film is clear upon drying.

The saran-coated film can be heat sealed to itself on the coated side with good bond strength. In addition to improvement of physical properties observed in the above examples, saran-coated multi-layer film has improved interface adhesion for TEG-treated film. This optional coating also improves gas barrier properties. Also, polymer-coated PAN film may be heat-laminated to other films, such as polyolefins.

Such products may be employed as transparent wrap for food or other packaged materials requiring heat-sealable tough barrier film.

What is claimed is:

1. A self-supporting uniform film consisting essentially of
   (a) biaxially-oriented high nitrile addition polymer containing at least 80% acrylonitrile repeating units; and
   (b) dispersed in the polymer triethylene glycol in sufficient amount to plasticize the polymer and substantially increase film toughness.

2. The film of claim 1 wherein the triethylene glycol is present in the amount of at least about 4 weight percent of the polymer.

3. The film of claim 2 wherein triethylene glycol is present in about 8 to 12 weight percent.

4. A continuous steady state process for treating polyacrylonitrile aquagel strip with a nonvolatile low molecular weight polyalkylene glycol having total miscibility with water comprising the steps of:
   passing the aquagel strip at substantially constant rate through an aqueous bath of said polyalkylene glycol, said aquagel containing at least about 40 weight % water uniformly dispersed in the polyacrylonitrile;
   contacting the aquagel strip with the aqueous bath during a predetermined residence time in the bath;
   passing the aquagel strip from the bath while removing excess aqueous bath therefrom;
   metering the polyalkylene glycol to the bath at a concentration greater than the aqueous polyalkylene glycol solution of the bath at a rate substantially proportionate to desired steady state treatment of polyalkylene glycol for the aquagel strip.

5. The process of claim 4 wherein the aquagel strip is machine direction oriented before it is treated with said polyalkylene glycol and tranversely oriented after said treatment.

6. The process of claim 4 wherein said glycol is triethylene glycol and is metered to the bath in an amount equivalent to at least 4 weight percent based on the dry polymer.

7. The process of claim 4 wherein the glycol additive is metered to the bath as substantially undiluted liquid and no additional water is input to the process.

8. In the process of producing oriented acrylonitrile polymer film by forming a polymer film from a hot solution of polymer in water soluble solvent, washing the polymer film to replace the solvent with water to form an aquagel film, stretching the aquagel to orient the polymer and drying the oriented polymer film to remove water; the improvement which comprises:
   treating the aquagel film with sufficient water-miscible glycol to increase impact strength of the polymer.

9. The process of claim 8 wherein the acrylonitrile polymer contains at least 80 percent acrylonitrile repeating units and the glycol consists essentially of triethylene glycol.

* * * * *